(12) United States Patent
Webber et al.

(10) Patent No.: US 7,110,163 B2
(45) Date of Patent: Sep. 19, 2006

(54) ELECTRO-OPTIC DISPLAY AND LAMINATION ADHESIVE FOR USE THEREIN

(75) Inventors: Richard M. Webber, Brookline, MA (US); Joseph M. Jacobson, Newton Centre, MA (US); Gregg M. Duthaler, Needham, MA (US); Karl R. Amundson, Cambridge, MA (US); Jonathan D. Albert, Philadelphia, PA (US); Andrew L. Loxley, Roslindale, MA (US); Mavyn M. Holman, Peabody, MA (US); Glen Crossley, Hamilton (CA); Katharine Geramita, Kingston (CA)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/708,121

(22) Filed: Feb. 10, 2004

(65) Prior Publication Data

US 2004/0252360 A1  Dec. 16, 2004

Related U.S. Application Data

(63) Continuation-in-part of application No. 10/064,389, filed on Jul. 9, 2002, now Pat. No. 6,831,769, said application No. 10/708,121.

(60) Provisional application No. 60/319,973, filed on Feb. 26, 2003, provisional application No. 60/319,934, filed on Feb. 11, 2003, provisional application No. 60/304,117, filed on Jul. 9, 2001.

(51) Int. Cl.
*G02B 26/00* (2006.01)

(52) U.S. Cl. .................. 359/296; 359/295; 359/298

(58) Field of Classification Search .............. 359/296, 359/290, 291, 298, 299, 295, 292, 293
See application file for complete search history.

(56) References Cited

U.S. PATENT DOCUMENTS

| 2,800,457 | A | 7/1957 | Green et al. |
|---|---|---|---|
| 3,668,106 | A | 6/1972 | Ota |
| 3,756,693 | A | 9/1973 | Ota |
| 3,767,392 | A | 10/1973 | Ota |
| 3,792,308 | A | 2/1974 | Ota |
| 3,870,517 | A | 3/1975 | Ota et al. |

(Continued)

FOREIGN PATENT DOCUMENTS

EP          0 659 866 A2      6/1995

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Alicia M. Harrington
*Assistant Examiner*—Brandi Thomas
(74) *Attorney, Agent, or Firm*—David J. Cole

(57) ABSTRACT

An electro-optic display comprises a layer (130) of a solid electro-optic material, at least one electrode disposed adjacent the layer (130) of electro-optic material, and a layer (180) of a lamination adhesive interposed between the layer (130) of electro-optic material and the electrode, the lamination adhesive (180) having a higher electrical conductivity in a direction perpendicular to the layer of lamination adhesive than in the plane of the layer.

22 Claims, 4 Drawing Sheets

U.S. PATENT DOCUMENTS

| | | |
|---|---|---|
| 3,892,568 A | 7/1975 | Ota |
| 4,001,140 A | 1/1977 | Foris et al. |
| 4,273,672 A | 6/1981 | Vassiliades |
| 4,418,346 A | 11/1983 | Batchelder |
| 4,448,493 A | 5/1984 | Matsudaira et al. |
| 4,550,982 A | 11/1985 | Hirai |
| 4,613,351 A | 9/1986 | Spohr |
| 4,640,583 A | 2/1987 | Hoshikawa et al. |
| 4,650,288 A | 3/1987 | White |
| 4,690,749 A | 9/1987 | Van Alstine et al. |
| 4,742,345 A | 5/1988 | DiSanto et al. |
| 4,892,607 A | 1/1990 | DiSanto et al. |
| 5,128,226 A | 7/1992 | Hung |
| 5,213,715 A | 5/1993 | Patterson et al. |
| 5,213,983 A | 5/1993 | Gustafsson et al. |
| 5,250,938 A | 10/1993 | DiSanto et al. |
| 5,302,235 A | 4/1994 | DiSanto et al. |
| 5,380,362 A | 1/1995 | Schubert |
| 5,403,518 A | 4/1995 | Schubert |
| 5,411,656 A | 5/1995 | Schubert |
| 5,460,688 A | 10/1995 | DiSanto et al. |
| 5,627,561 A | 5/1997 | Laspina et al. |
| 5,635,317 A | 6/1997 | Taniguchi et al. |
| 5,686,383 A | 11/1997 | Long et al. |
| 5,688,584 A | 11/1997 | Casson et al. |
| 5,699,097 A | 12/1997 | Takayama et al. |
| 5,707,738 A | 1/1998 | Hou |
| 5,737,115 A | 4/1998 | Mackinlay et al. |
| 5,745,094 A | 4/1998 | Gordon, II et al. |
| 5,760,761 A | 6/1998 | Sheridon |
| 5,777,782 A | 7/1998 | Sheridon |
| 5,784,190 A | 7/1998 | Worley |
| 5,808,783 A | 9/1998 | Crowley |
| 5,872,552 A | 2/1999 | Gordon, II et al. |
| 5,891,366 A | 4/1999 | Gruenwald et al. |
| 5,930,026 A | 7/1999 | Jacobson et al. |
| 5,961,804 A | 10/1999 | Jacobson et al. |
| 5,972,493 A | 10/1999 | Iwasaki et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,113,810 A | 9/2000 | Hou et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,136,128 A | 10/2000 | Chung |
| 6,137,467 A | 10/2000 | Sheridon et al. |
| 6,140,405 A | 10/2000 | Eckstein et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,331 B1 | 2/2001 | Chiang et al. |
| 6,184,856 B1 | 2/2001 | Gordon, II et al. |
| 6,204,556 B1 * | 3/2001 | Hakamata .................. 257/728 |
| 6,215,920 B1 | 4/2001 | Whitehead et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,344,155 B1 | 2/2002 | Kitahara et al. |
| 6,365,949 B1 | 4/2002 | Ruiter et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,428,650 B1 | 8/2002 | Chung |
| 6,445,374 B1 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B1 | 11/2002 | Turner et al. |
| 6,498,114 B1 | 12/2002 | Amundson et al. |
| 6,504,524 B1 | 1/2003 | Gates et al. |
| 6,506,438 B1 | 1/2003 | Duthaler et al. |
| 6,512,354 B1 | 1/2003 | Jacobson et al. |
| 6,515,649 B1 | 2/2003 | Albert et al. |
| 6,518,949 B1 | 2/2003 | Drzaic |
| 6,521,489 B1 | 2/2003 | Duthaler et al. |
| 6,531,997 B1 | 3/2003 | Gates et al. |
| 6,535,197 B1 | 3/2003 | Comiskey et al. |
| 6,538,801 B1 | 3/2003 | Jacobson et al. |
| 6,545,291 B1 | 4/2003 | Amundson et al. |
| 6,580,545 B1 | 6/2003 | Morrison et al. |
| 6,639,578 B1 | 10/2003 | Comiskey et al. |
| 6,652,075 B1 | 11/2003 | Jacobson |
| 6,657,772 B1 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B1 | 1/2004 | Kazlas et al. |
| 6,693,620 B1 | 2/2004 | Herb et al. |
| 6,704,133 B1 | 3/2004 | Gates et al. |
| 6,710,540 B1 | 3/2004 | Albert et al. |
| 6,721,083 B1 | 4/2004 | Jacobson et al. |
| 6,724,519 B1 | 4/2004 | Comiskey et al. |
| 6,727,881 B1 | 4/2004 | Albert et al. |
| 6,738,050 B1 | 5/2004 | Comiskey et al. |
| 6,750,473 B1 | 6/2004 | Amundson et al. |
| 6,753,999 B1 | 6/2004 | Zehner et al. |
| 6,788,449 B1 | 9/2004 | Liang et al. |
| 6,816,147 B1 | 11/2004 | Albert |
| 6,819,471 B1 | 11/2004 | Amundson et al. |
| 6,822,782 B1 | 11/2004 | Honeyman et al. |
| 6,825,068 B1 | 11/2004 | Denis et al. |
| 6,825,829 B1 | 11/2004 | Albert et al. |
| 6,825,970 B1 | 11/2004 | Goenaga et al. |
| 6,831,769 B1 | 12/2004 | Holman et al. |
| 6,839,158 B1 | 1/2005 | Albert et al. |
| 6,842,167 B1 | 1/2005 | Albert et al. |
| 6,842,279 B1 | 1/2005 | Amundson |
| 6,842,657 B1 | 1/2005 | Drzaic et al. |
| 6,864,875 B1 | 3/2005 | Drzaic et al. |
| 6,865,010 B1 | 3/2005 | Duthaler et al. |
| 6,866,760 B1 | 3/2005 | Paolini Jr. et al. |
| 6,870,661 B1 | 3/2005 | Pullen et al. |
| 2001/0030639 A1 | 10/2001 | Goden |
| 2002/0027635 A1 | 3/2002 | Sakamaki et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2003/0011560 A1 | 1/2003 | Albert et al. |

| | | | |
|---|---|---|---|
| 2003/0020844 A1 | 1/2003 | Albert et al. | |
| 2003/0102858 A1 | 6/2003 | Jacobson et al. | |
| 2003/0132908 A1 | 7/2003 | Herb et al. | |
| 2003/0137521 A1 | 7/2003 | Zehner et al. | |
| 2003/0151702 A1 | 8/2003 | Morrison et al. | |
| 2003/0179437 A1 | 9/2003 | Liang et al. | |
| 2003/0214695 A1 | 11/2003 | Abramson et al. | |
| 2003/0214697 A1* | 11/2003 | Duthaler et al. | 359/296 |
| 2003/0222315 A1 | 12/2003 | Amundson et al. | |
| 2004/0012839 A1 | 1/2004 | Cao et al. | |
| 2004/0014265 A1 | 1/2004 | Kazlas et al. | |
| 2004/0027327 A1 | 2/2004 | LeCain et al. | |
| 2004/0075634 A1 | 4/2004 | Gates | |
| 2004/0094422 A1 | 5/2004 | Pullen et al. | |
| 2004/0105036 A1 | 6/2004 | Danner et al. | |
| 2004/0112525 A1 | 6/2004 | Pereira et al. | |
| 2004/0112750 A1 | 6/2004 | Jacobson et al. | |
| 2004/0119681 A1 | 6/2004 | Albert et al. | |
| 2004/0120024 A1 | 6/2004 | Chen et al. | |
| 2004/0136048 A1 | 7/2004 | Arango et al. | |
| 2004/0155857 A1 | 8/2004 | Duthaler et al. | |
| 2004/0180476 A1* | 9/2004 | Kazlas et al. | 438/146 |
| 2004/0196215 A1 | 10/2004 | Duthaler et al. | |
| 2004/0233509 A1 | 11/2004 | Zhang et al. | |
| 2004/0257635 A1 | 12/2004 | Paolini, Jr. et al. | |
| 2005/0000813 A1 | 1/2005 | Pullen et al. | |
| 2005/0035941 A1 | 2/2005 | Albert et al. | |
| 2005/0099672 A1 | 5/2005 | Jacobson et al. | |

FOREIGN PATENT DOCUMENTS

| | | |
|---|---|---|
| EP | 1 145 072 B1 | 5/2003 |
| JP | 02-223936 A | 9/1990 |
| JP | 02-284124 A | 11/1990 |
| JP | 02-284125 A | 11/1990 |
| JP | 05-143009 A | 6/1993 |
| JP | 05-307197 A | 11/1993 |
| JP | 06-118452 A | 4/1994 |
| JP | 2000-259102 | 9/2000 |
| JP | 2002-072258 | 3/2002 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |
| WO | WO 03/107315 | 12/2003 |

OTHER PUBLICATIONS

Bach, U., et al., "Nanomaterials-Based Electrochromics for Paper-Quality Displays", Adv. Mater, 14(11), 845 (2002).

Chen, Y., et al., "A Conformable Electronic Ink Display using a Foil-Based a-Si TFT Array", SID 01 Digest, 157 (Jun. 2001).

Comiskey, B., et al., "An electrophorectic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Stimulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gutcho, M.H., Microcapsules and Microencapsulation Techniques, Noyes Data Corp., Park Ridge NJ; (1976).

Henzen, A. et al., "Development of Active Matrix Electronic Ink Displays for Handheld Devices", SID 03 Digest, 176, (2003).

Hou, J., et al., "Active Matrix Electrophoretic Displays Containing Black and White Particles with Opposite Polarities", SID 01 Digest, 164 (Jun. 2001).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P., et al., "12.1 SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-senisitized colloidal $TiO_2$ Films", Nature, vol. 353, Oct. 24, 1991, 773-740.

Ota, I., et al., "Developments in Electrophoretic Displays", Proceedings of the SID, 18, 243 (1977).

Pitt, M.G., et al., "Power Consumption of Microencapsulated Electrophoretic Displays for Smart Handheld Applications", SID 02 Digest, 1378 (2002).

Vandegaer, J.E. (ed.), "Microencapsulation Processes and Applications", pp. v-x, 1-180 (Plenum Press, New York 1974).

Webber, R., "Image Stability in Active-Matrix Microencapsulated Electrophoretic Displays", SID 02 Digest, 126 (2002).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

US 7,110,163 B2

ELECTRO-OPTIC DISPLAY AND LAMINATION ADHESIVE FOR USE THEREIN

CROSS REFERENCE TO RELATED APPLICATIONS

This application is a continuation-in-part of copending application Ser. No. 10/064,389 (Publication No. 2003/0025855), filed Jul. 9, 2002, which claims benefit of application Ser. No. 60/304,117, filed Jul. 9, 2001. This application also claims benefit of application Ser. No. 60/319,934, filed Feb. 11, 2003 and application Ser. No. 60/319,973, filed Feb. 26, 2003.

This application is also related to the following applications and patents: (a) application Ser. No. 10/329,023 (Publication No. 2003/0112491, now U.S. Pat. No. 6,727,881), filed Dec. 24, 2002; (b) application Ser. No. 09/140,846, filed Aug. 27, 1998, of which the aforementioned application Ser. No. 10/329,023 is a continuation; (c) application Ser. No. 08/504,896, filed Jul. 20, 1995 (now U.S. Pat. No. 6,124,851), of which the aforementioned application Ser. No. 09/140,846 is a continuation-in-part; (d) application Ser. No. 08/983,404, filed Mar. 26, 1999, of which the aforementioned application Ser. No. 09/140,846 is a continuation-in-part; (e) International Application No. PCT/US96/12000 (Publication No. WO 97/04398), of which the aforementioned application Ser. No. 08/983,404 is the United States national phase; (f) application Ser. No. 08/935,800, filed Sep. 23, 1997 (now U.S. Pat. No. 6,120,588), of which the aforementioned application Ser. No. 09/140,846 is a continuation-in-part; (g) Provisional Applications Ser. Nos. 60/057,118; 60/057,122; 60/057,133; 60/057,163; 60/057,716; 60/057,798; 60/057,799; 60/059,358; 60/059,543; 60/065,529; 60/065,605; 60/065,630; 60/066,115; 60/066,147; 60/066,245; 60/066,246; 60/066,334; 60/066,418; 60/070,935; 60/070,939; 60/070,940; 60/071,371; 60/072,390; 60/074,454; 60/076,955; 60/076,956; 60/076,957; 60/076,959; 60/076,978; 60/078,363; 60/081,362; 60/081,374; 60/083,252; 60/085,096; 60/090,222; 60/090,223; 60/090,232; 60/092,046; 60/092,050; 60/092,742; and 60/093,689; from all of which the aforementioned application Ser. No. 09/140,846 claims priority; (h) application Ser. No. 10/064,279, filed Jun. 28, 2002 (now U.S. Pat. No. 6,657,772); (i) application Ser. No. 60/304,015, filed Jul. 9, 2001, from which the aforementioned application Ser. No. 10/064,279 claims priority; (j) application Ser. No. 10/249,957, filed May 23, 2003 (Publication No. 2004/0027327); (k) application Ser. No. 10/605,024, filed Sep. 2, 2003 (Publication No. 2004/0155857); and (l) U.S. Pat. No. 6,312,304. The entire contents of all the aforementioned applications, and of all United States Patents, published applications and copending applications mentioned below are herein incorporated by reference.

BACKGROUND OF INVENTION

This invention relates to electro-optic displays and to adhesive compositions for use therein. This invention relates in part to adhesive compositions with electrical properties which render them especially suitable for use in electro-optic displays. Certain adhesive compositions of the present invention may also be useful in applications other than electro-optic displays. This invention also relates to materials and processes for lamination of electro-optic displays.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

The electro-optic displays of the present invention typically contain an electro-optic material which is a solid in the sense that the electro-optic material has solid external surfaces, although the material may, and often does, have internal liquid- or gas-filled spaces, and to methods for assembling displays using such an electro-optic material. Such displays using solid electro-optic materials may hereinafter for convenience be referred to as "solid electro-optic displays". Thus, the term "solid electro-optic displays" includes rotating bichromal member displays (see below), encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. patent application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. D485,294; 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; and 6,683,333; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0076573; 2003/0096113; 2003/0102858; 2003/0132908; 2003/0137521; 2003/0137717; 2003/0151702; 2003/0189749; 2003/0214695; 2003/0214697 and 2003/0222315; and International Applications Publication Nos. WO 99/67678; WO 00/05704; WO 00/38000; WO 00/38001; WO 00/36560; WO 00/67110; WO 00/67327; WO 01/07961; WO 01/08241; and WO 03/104884.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: premetered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; inkjet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within capsules but instead are retained within a plurality of cavities formed within a carrier medium, typically a polymeric film. See, for example, International Application Publication No. WO 02/01281, and published U.S. Application No. 2002/0075556, both assigned to Sipix Imaging, Inc.

Other types of electro-optic materials, for example, polymer-dispersed liquid crystal, may also be used in the displays of the present invention.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display useable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, especially in the case of a display using an encapsulated electrophoretic medium. The lamination adhesive must have sufficient adhesive strength to bind the electro-optic layer to the layer (typically an electrode layer) to which it is to be laminated, and in the case of an encapsulated electrophoretic medium, the adhesive must also have sufficient adhesive strength to mechanically hold the capsules together. If the electro-optic display is to be of a flexible type (and one of the important advantages of rotating bichromal member and encapsulated electrophoretic displays is that they can be made flexible), the adhesive must have sufficient flexibility not to introduce defects into the display when the display is flexed. The lamination adhesive must have adequate flow properties at the lamination temperature to ensure high quality lamination, and in this regard, the demands of laminating encapsulated electrophoretic and some other types of electro-optic media are unusually difficult; the lamination has to be conducted at a temperature of not more than about 110° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive must be chemically compatible with all the other materials in the display. Solvent-based lamination adhesives should be avoided; it has been found (although this does not appear to have been described in the literature), that any solvent left behind in the adhesive after lamination has a strong tendency to introduce undesirable contaminants into the electro-optic medium.

As discussed in detail in the aforementioned copending application Ser. No. 10/064,389, a lamination adhesive used in an electro-optic display must meet certain electrical criteria, and this introduces considerable problems in the selection of the lamination adhesive. Commercial manufacturers of lamination adhesives naturally devote considerable effort to ensuring that properties, such as strength of adhesion and lamination temperatures, of such adhesives are adjusted so that the adhesives perform well in their major applications, which typically involve laminating polymeric and similar films. However, in such applications, the electrical properties of the lamination adhesive are not relevant, and consequently the commercial manufacturers pay no heed to such electrical properties. Indeed, E Ink researchers have observed substantial variations (of up to several fold) in certain electrical properties between different batches of the same commercial lamination adhesive, presumably because the manufacturer was attempting to optimize non-electrical properties of the lamination adhesive (for example, resistance to bacterial growth) and was not at all concerned about resulting changes in electrical properties.

However, in electro-optic displays, in which the lamination adhesive is normally located between the electrodes which apply the electric field needed to change the electrical state of the electro-optic medium, the electrical properties of the adhesive become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved. On the other hand, if the adhesive layer, which extends continuously across the display, is in contact with a matrix of electrodes, as in an active matrix display, the volume resistivity of the adhesive layer should not be too low, or lateral conduction of electric current through the continuous adhesive layer may cause undesirable cross-talk between adjacent electrodes.

In practice, a lamination adhesive layer having a uniform thickness of 10–50 $\mu$m and a conductivity of the order of $10^{-10}$ to $10^{-9}$ S/cm has been used in electro-optic displays. This conductivity range was chosen based upon electrical models for display performance, the known conductivities of various electro-optic materials and the pixel sizes typically used in such displays. This target conductivity range actually represents a compromise. More conductive lamination adhesives are desirable because higher conductivity means the electro-optic material layer sees a larger voltage gradient. However, as the conductivity of the lamination adhesive is increased at constant pixel resolution and storage capacitance, charge supplied to a pixel is leaked to neighboring pixels; this decreases the voltage gradient across the ink and counteracts the effect of increasing the lamination adhesive conductivity. In addition, as already mentioned this lateral charge leakage may cause a change in the optical state of neighboring pixels. It is desirable that the lamination adhesive be designed to provide good lateral voltage holding capability and that the gradient in voltage across the ink layer be maximized; therefore, development performance requirements for high resolution (100 to 200 lines per inch, 4 to 8 lines per mm) active-matrix displays require that isotropically conductive adhesives have conductivities in the range specified above.

Furthermore, in considering the choice of a lamination adhesive for use in an electro-optic display, attention must be paid to the process by which the display is to be assembled. Most prior art methods for final lamination of electrophoretic displays are essentially batch methods in which the electro-optic medium, the lamination adhesive and the backplane are only brought together immediately prior to final assembly, and it is desirable to provide methods better adapted for mass production. However, the aforementioned copending application Ser. No. 10/249,957 describes a method of assembling a solid electro-optic display (including a particle-based electrophoretic display) which is well adapted for mass production. Essentially, this copending application describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this copending application and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or indium-tin-oxide (ITO), or may be a conductive polymer. Polyethylene terephthalate (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned copending application Ser. No. 10/249,957 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned copending application Ser. No. 10/249,957 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned copending application Ser. No. 10/605,024 describes a so-called "double release film" which is essentially a simplified version of the front plane laminate previously described. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a back-plane to form the final display.

In view of the advantages of the assembly method using a front plane laminate described in the aforementioned copending application Ser. No. 10/249,957, it is desirable that a lamination adhesive be capable of being incorporated into such a front plane laminate. It is also desirable that a lamination adhesive be capable of being incorporated into a double release film as previously described.

This invention relates to materials and processes which are useful in the lamination of electro-optic displays. In particular, it has now been found that the performance of solid electro-optic displays can be improved by using a lamination adhesive having anisotropic conductivity, and this invention relates to electro-optic displays comprising such an adhesive, to processes for forming layers of such adhesives and incorporating them into electro-optic displays, and to front plane laminates comprising such an adhesive. Since the materials and processes of the invention are especially, but not exclusively, intended for the lamination of encapsulated electrophoretic displays, they will primarily be described in connection with such displays, since any modifications and variations of the materials and processes of the present invention needed for use with other types of electro-optic displays will readily be apparent to those skilled in the manufacture of such displays.

SUMMARY OF INVENTION

Accordingly, in one aspect this invention provides an electro-optic display comprising a layer of a solid electro-optic material, at least one electrode disposed adjacent the layer of electro-optic material, and a layer of a lamination adhesive interposed between the electro-optic material and the electrode, the lamination adhesive having a higher electrical conductivity in a direction perpendicular to the layer of lamination adhesive than in the plane of the layer.

In such an electro-optic display, the lamination adhesive desirably has a conductivity of less than about $10^{-10}$ S/cm. in the plane of the adhesive layer and a conductivity greater than about $10^{-9}$ S/cm. perpendicular to this plane. The lamination adhesive may comprise a plurality of conductive particles dispersed in a substantially non-conductive matrix. The conductive particles may have a conductivity greater than about $10^{-9}$ S/cm. and a diameter not greater than about one-tenth of the thickness of the layer of lamination adhesive. The conductive particles may be formed from a semiconducting polymer, or from a low conductivity material having a polar material adsorbed on its surface to increase its conductivity. The matrix may have a conductivity less than about $10^{-10}$ S/cm. and may comprise a gellable material, for example a thermally reversibly gellable polymer, a radiation-gellable material or a material which can be gelled by removal of a solvent therefrom. Alternatively, the lamination adhesive may comprise a plurality of magnetizable particles dispersed in a substantially non-magnetizable matrix. The magnetizable particles may comprise an iron oxide.

The electro-optic display of the present invention may use of the types of electro-optic material described above. Thus, the electro-optic material may be a rotating bichromal member, microcell, electrochromic or electrophoretic material. In a preferred embodiment of the invention, the electro-optic material is an encapsulated electrophoretic material.

This invention also provides a process for forming a layer of an anisotropic adhesive having greater conductivity perpendicular to the plane of the layer than in this plane, the process comprising:

dispersing a plurality of conductive particles in an adhesive matrix, the particles having a complex conductivity differing from that of the matrix;

applying to the particles/matrix mixture an electric or magnetic field effective to cause the particles to form conductive strands extending substantially perpendicular to the plane of the layer; and increasing the viscosity of the matrix to prevent the particles moving our of the strands.

In this process, the conductive particles may have a conductivity greater than about $10^{-9}$ S/cm. and a diameter not greater than about one-tenth of the thickness of the layer of lamination adhesive. The conductive particles may be formed from a semiconducting polymer, or from a low conductivity material having a polar material adsorbed on its surface to increase its conductivity. The matrix may have a conductivity less than about $10^{-10}$ S/cm. The particles may be magnetizable and the matrix substantially non-magnetizable, in which case the magnetizable particles may comprise an iron oxide. The process of the present invention may include laminating the layer of anisotropic adhesive formed to a layer of an electro-optic material.

This invention also provides an article of manufacture (a front plane laminate) comprising, in order:

a light-transmissive electrically-conductive layer;

a layer of a solid electro-optic medium in electrical contact with the electrically-conductive layer;

a layer of an adhesive having a higher electrical conductivity in a direction perpendicular to the layer of lamination adhesive than in the plane of the layer; and a release sheet.

Finally, this invention provides an article of manufacture (a double release film) comprising:

a layer of a solid electro-optic medium having first and second surface on opposed sides thereof;

a first adhesive layer on the first surface of the layer of solid electro-optic medium;

a release sheet disposed on the opposed side of the first adhesive layer from the layer of solid electro-optic medium; and a second adhesive layer on the second surface of the layer of solid electro-optic medium, at least one of the first and second adhesive layers having a higher electrical conductivity in a direction perpendicular to the adhesive layer than in the plane of the layer.

DETAILED DESCRIPTION

Figure 1:
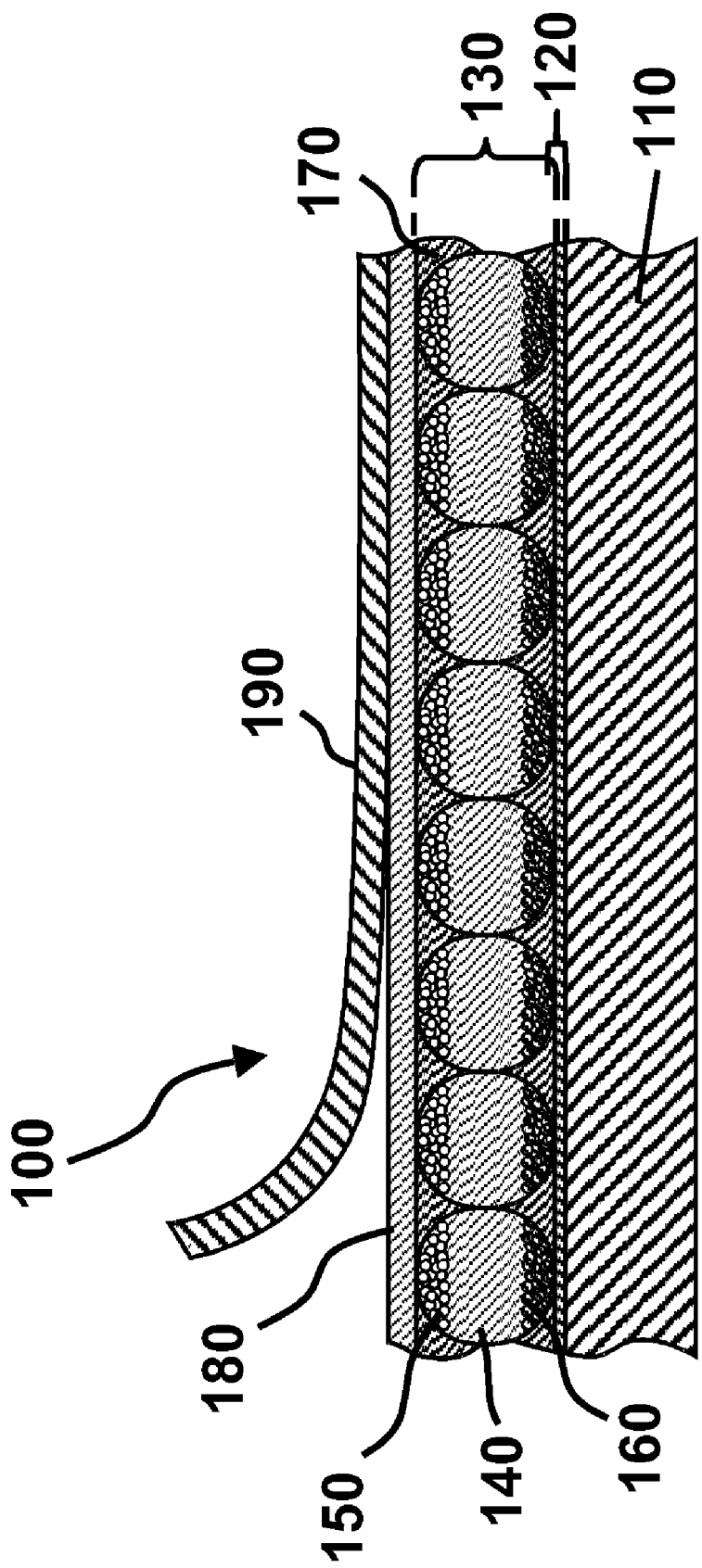
FIG. 1 is a schematic cross-section through a front plane laminate of the present invention.

As already mentioned, this invention relates to electro-optic displays containing an adhesive having anisotropic conductivity, to process for forming layers of such an adhesive, and to front plane laminates containing such an adhesive.

Before describing the present invention in detail, it is considered desirable to explain in more detail the processes in which a lamination adhesive is used in the manufacture of an electro-optic display. As already explained, in a typical process, two subassemblies are first manufactured, one subassembly comprising an electro-optic layer and a first substrate, and the second comprising a second substrate; at least one of the subassemblies, and typically both, comprise an electrode. Also as already indicated, in one common form of such a process, used for manufacturing an active matrix display, one subassembly comprises a substrate, a single continuous ("common") electrode which extends across multiple pixels, and typically the whole, of the display, and the electro-optic layer, while the second assembly (usually referred to as the "backplane") comprises a substrate, a matrix of pixel electrodes, which define the individual pixels of the display, and non-linear devices (typically thin film transistors) and other circuitry used to produce on the pixel electrodes the potentials needed to drive the display (i.e., to switch the various pixels to the optical states necessary to provide a desired image on the display). The lamination adhesive is provided between the first and second subassemblies and adheres them together to form the final display.

In theory, if one could find a lamination adhesive with the necessary physical and mechanical properties, one could bring the two assemblies and the lamination adhesive together and form the display in a single operation, for example by feeding the three components from separate rolls and performing the lamination on a roll-to-roll basis. However, in the present state of the art this is not practicable, and normally the lamination adhesive is first applied to one of the two subassemblies, and thereafter the subassembly/adhesive combination is laminated to the other subassembly to form the final display. The lamination adhesive may be applied to either subassembly, but in general it is preferred that it be applied to the subassembly containing the electro-optic medium. As already mentioned, certain electro-optic media can be applied by printing or coating techniques on rigid or flexible substrates, and hence can be applied to flexible substrates, such as polymeric films, inexpensively by roll-to-roll processes. As discussed in the aforementioned copending application Ser. No. 10/249,957, coating an electro-optic medium on to a flexible substrate in this manner, then covering the electro-optic medium with a lamination adhesive and a release sheet, provides a so-called "front plane laminate" which can then be cut as desired to produce portions suitable for lamination to a wide variety of backplanes. Applying the lamination adhesive to the backplane tends to be less convenient (although the present invention does not exclude this possibility), since in the present state of technology most backplanes are prepared on rigid substrates which are in the form of individual sheets less convenient for coating.

Regardless of which subassembly receives the lamination adhesive, there are two main variants of the adhesive application process, namely direct and indirect processes. Lamination adhesives are typically supplied as liquid or semi-solid solutions or dispersions, which need to be converted (either by removal of a solvent or dispersant or by some other form of curing) to a substantially solid layer before the actual lamination. In a direct process, the lamination adhesive is applied directly to one subassembly and converted to the solid layer thereon. In an indirect process, the lamination adhesive is applied to a release sheet, converted to a solid layer on this release sheet, and then transferred, typically using heat and/or pressure, to one subassembly. Finally, the release sheet is removed from the solid layer of lamination adhesive before the final lamination to the other subassembly. In general, indirect methods are preferred over direct, since many commercial lamination adhesives contain relatively mobile species, such as organic solvents and/or free monomers, which may adversely affect either the electro-optic medium or the circuitry of the backplane, depending upon the subassembly to which the adhesive is applied. An indirect process, by permitting these relatively mobile species to be removed by drying or similar processes while the lamination adhesive is still on the release sheet, avoids the adverse effects of bringing these relatively volatile materials into contact with the electro-optic medium or circuitry of the backplane.

A preferred lamination process of the present invention will now be described, though by way of illustration only, with reference to FIG. 1 of the accompanying drawings, which is a schematic section through one subassembly (a front plane laminate, or FPL) used in a process of the present invention, this subassembly comprising a substrate, a conductive layer, an electro-optic layer and an adhesive layer, the subassembly being illustrated at an intermediate stage of the process before this subassembly is laminated to a second subassembly.

The front plane laminate (generally designated 100) shown in FIG. 1 comprises a light-transmissive substrate 110, a light-transmissive electrode layer 120 (note that this is not the electrode between which and the electro-optic layer the lamination adhesive is finally sandwiched in the electro-optic display of the present invention), an electro-optic layer 130, a lamination adhesive layer 180 and a release sheet 190; the release sheet is illustrated in the process of being removed from the lamination adhesive layer 180 preparatory to lamination of the FPL 100 to a backplane.

The substrate 110 is typically a transparent plastic film, such as a 7 mil (177 µm) polyethylene terephthalate (PET) sheet. The lower surface (in FIG. 1) of substrate 110, which forms the viewing surface of the final display, may have one or more additional layers (not shown), for example a protective layer to absorb ultra-violet radiation, barrier layers to prevent ingress of oxygen or moisture into the final display, and anti-reflection coatings to improve the optical properties of the display. Coated onto the upper surface of substrate 110 is the thin light-transmissive electrically conductive layer 120, preferably of ITO, which acts as the common front electrode in the final display. PET films coated with ITO are available commercially.

The electro-optic layer 130 may be deposited on the conductive layer 120, typically by slot coating, the two layers being in electrical contact. The electro-optic layer 130 shown in FIG. 1 is an encapsulated electrophoretic medium and comprises microcapsules 140, each of which comprises negatively charged white particles 150 and positively charged black particles 160 suspending in a hydrocarbon-based suspending fluid 165. The microcapsules 140 are held retained within a polymeric binder 170. Upon application of an electrical field across electro-optic layer 130, white particles 150 move to the positive electrode and black particles 160 move to the negative electrode, so that electro-optic layer 130 appears, to an observer viewing the display through substrate 110, white or black depending on whether conductive layer 120 is positive or negative relative to the adjacent pixel electrode in the backplane.

The FPL 100 is desirably prepared by coating the lamination adhesive 180, in liquid form, conveniently by slot coating, on to release sheet 190, drying (or otherwise curing) the adhesive to form a solid layer and then laminating the adhesive and release sheet to the electro-optic layer 130, which has previously been coated on to the substrate 110 bearing the conductive layer 120; this lamination may conveniently be effected using hot roll lamination. (Alternatively, but less desirably, the lamination adhesive may be applied over the electro-optic layer 130 and there dried or otherwise cured before being covered with the release sheet 190.) The release sheet 190 is conveniently a 7 mil (177 µm) film; depending upon the nature of the electro-optic medium used, it may be desirable to coat this film with a release agent, for example a silicone. As illustrated in FIG. 1, the release sheet 190 is peeled or otherwise removed from the lamination adhesive 180 before the FPL 100 is laminated to a backplane (not shown) to form the final display.

The front plane laminate 100 has an anisotropic adhesive layer 180, this adhesive layer 180 having a greater conductivity perpendicular to the plane of the layer (i.e., along the thickness of the layer) than in the plane of the layer.

For further details regarding front plane laminates and processes for the preparation and use thereof, the reader is respectfully directed to the aforementioned copending application Ser. No. 10/249,957.

Figure 2:
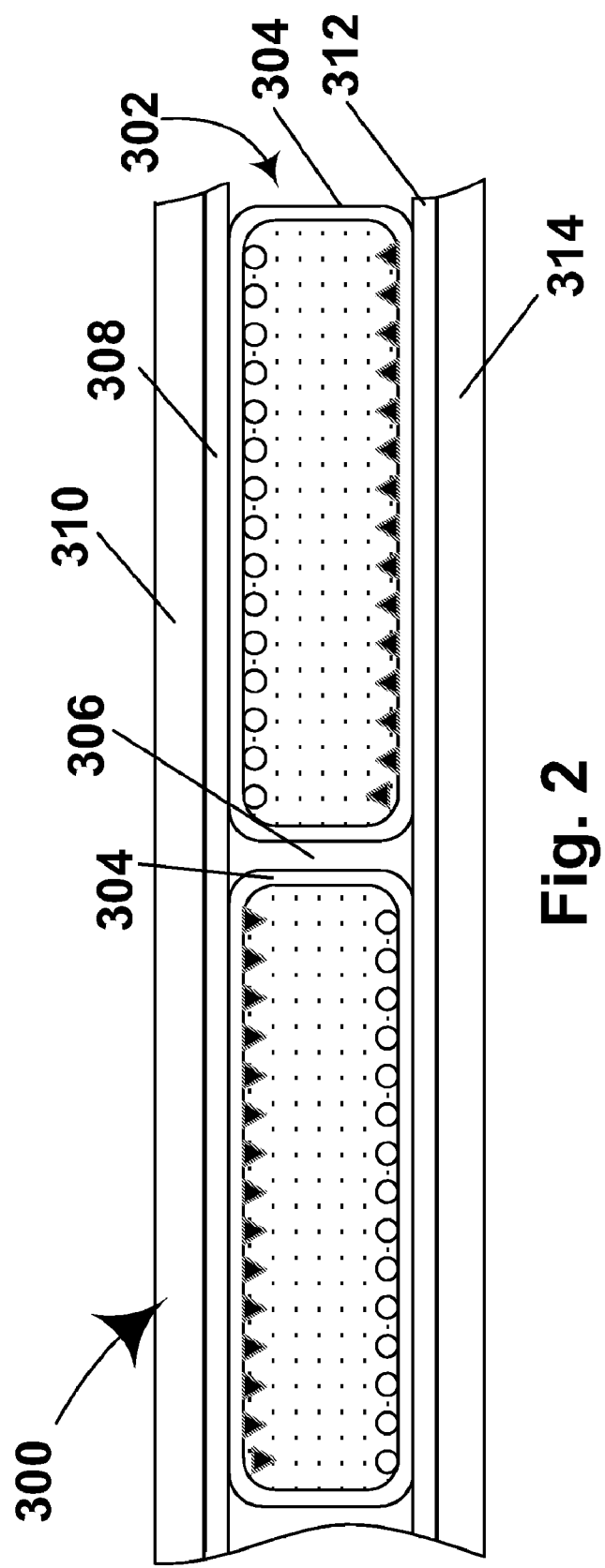
FIG. 2 is a schematic cross-section through a double release film of the present invention.

A preferred double release sheet (generally designated 300) of the present invention is shown in FIG. 2 of the accompanying drawings. This sheet 300 comprises a central layer 302 of electro-optic material, specifically in FIG. 2 a layer comprising capsules 304 in a polymeric binder 306. The capsules 304 may be similar to those described above with reference to FIG. 1. The sheet 300 further comprises a first adhesive layer 308, a first release sheet 310 covering the first adhesive layer 308, a second adhesive layer 312 disposed on the opposed side of the layer 302 from the first adhesive layer 308, and a second release sheet 314 covering the second adhesive layer 312.

The sheet 300 may be formed by first coating a the release sheet 310 with a layer of adhesive which is then dried or cured to form the first adhesive layer 308. Next, a mixture of the capsules 304 and binder 306 is printed or otherwise deposited on the first adhesive layer 308, and then the mixture is dried or cured to form a coherent layer 302. Finally, a layer of adhesive is deposited over the layer 302, dried or cured to form the second adhesive layer 312, and covered by the second release sheet 314.

It will be apparent to those skilled in coating technology that this sequence of operations used to form the sheet 300 is well adapted for continuous production and that, by careful choice of materials and process conditions, it may be possible to carry out the entire sequence of operations in a single pass through conventional roll-to-roll coating apparatus.

To assemble a display using a double release film such as the film 300, one release sheet (typically that on to which the electro-optic material was coated) is peeled away, and the remaining layers of the double release film are attached to a front substrate using, for example a thermal, radiation, or chemically based lamination process. Typically, the front substrate will include a conductive layer which will form the front electrode of the final display. The front substrate may include additional layers, such as an ultra-violet filter or a protective layer intended to protect the conductive layer from mechanical damage. Thereafter, the other release sheet is peeled away, thereby exposing the second adhesive layer, which is used to attach the electro-optic material coating assembly to a back-plane. Again, a thermal, radiation, or chemically based lamination process may be used. It will be appreciated that the order of the two laminations described is essentially arbitrary and could be reversed, although it practice it is almost always more convenient to laminate the double release film to the front substrate first, and thereafter to laminate the resulting front subassembly to the backplane.

In accordance with the present invention, either or both of the adhesive layers 308 and 312 may be formed from an anisotropic adhesive having greater conductivity perpendicular to the plane of the adhesive layer than in this plane. In practice, it is typically preferred to form only the adhesive layer which will be laminated to the backplane from an anisotropic adhesive, using a conventional isotropic adhesive for the adhesive layer which will be laminated to the front substrate. For reasons discussed above, the use of an anisotropic adhesive is especially useful adjacent a backplane in preventing cross-talk between adjacent electrodes in a backplane. The strand-containing anisotropic adhesives formed by the processes of the present invention may be somewhat less transparent than conventional isotropic adhesives, but this is typically not a problem when such adhesives are used between the backplane and the electro-optic medium; most solid electro-optic media are essentially opaque, so that an adhesive layer adjacent the backplane is not visible to an observer viewing the display through the front substrate. On the other hand, since the front substrate typically carries a single continuous electrode, cross-talk is not usually a problem, whereas reduced transparency may be, since an adhesive layer adjacent the front substrate is visible to an observer viewing the display through the front substrate.

For further details regarding double release films and processes for the preparation and use thereof, the reader is respectfully directed to the aforementioned copending application Ser. No. 10/605,024.

As already mentioned, the present invention relates to the use of an anisotropic lamination adhesive having a conductivity which is greater in the direction from the electrode to the electro-optic material (i.e., perpendicular to the thickness of the layer of lamination adhesive) than in the plane of this layer. Such an anisotropic adhesive produces only a small voltage drop between the electrode and the electro-optic material (thus allowing as large an electric field as possible across the layer of electro-optic material) while presenting high resistance to current flow between adjacent electrodes, and thus minimizing cross-talk between adjacent pixels of a display.

The lamination adhesive used in the present invention is typically a hot melt adhesive, but can also be a thermosetting, radiation curable, or pressure sensitive adhesive. The adhesive may be based upon ethylene vinyl acetate, acrylic, polyolefin, polyamide, polyester, polyurethane, silicone, epoxy, polyvinyl butyrate, polystyrene-butadiene or vinyl. To provide the necessary anisotropic conductivity, the adhesive may be loaded with conductive particles, for example carbon particles, silver particles, plated polymer spheres, plated glass spheres, indium-tin-oxide particles, or nanophase indium-tin-oxide particles. Alternatively, conductive polymers such as polyacetylene, polyaniline, polypyrrole, poly(3,4-ethylenedioxythiophene) (PEDOT), or polythiophene can be used to dope the polymer and cause it to conduct well in the z-axis direction (perpendicular to the thickness of the layer of adhesive) but not in the plane of this layer. In order to make these films, the adhesive sheet can be cast and then stretched in one or both axes to introduce the necessary anisotropic conductivity. Various types of anisotropic adhesives are described in U.S. Pat. Nos. 6,365,949; 5,213,715; and 4,613,351, and anisotropic adhesives are available commercially, for example from Minnesota Mining and Manufacturing Corporation ("3M"), Henkel Loctite Corporation, 1001 Trout Brook Crossing, Rocky Hill Conn. 06067, Btech Corporation, 8395 Greenwood Drive, Longmont Colo. 80503, and Dana Enterprises International, 43006 Osgood Road, Fremont Calif. 94539.

It is generally preferred that the anisotropic adhesive used in the present invention have a conductivity of less than about $10^{-10}$ S/cm. in the plane of the adhesive layer and a conductivity greater than about $10^{-9}$ S/cm. in a the z-axis direction.

However, it appears that the commercially available anisotropic adhesives are not well adapted for use in high resolution active matrix electro-optic displays having resolutions of 150 lines per inch (approximately 6 lines per mm) or more. According to the manufacturers' technical literature, most if not all currently commercially available anisotropic adhesives consist of randomly dispersed metal-coated polymer or metallic particles in an high resistivity adhesive matrix, so that these materials are isotropic, low conductivity films prior to application of z-axis pressure to introduce the desired anisotropy. The volume fraction of the metal or metal-coated particles is low enough that the particles do not percolate, and therefore, do no electrically short the adhesive in any direction. High z-axis conductivity is achieved when pressure is applied in the z-axis direction, and through either a reduction of the film thickness to less than the particle size or local increases in particle volume fraction (due to flow of the adhesive matrix into intentional voids or gaps in the substrate geometry), the particles make mechanical contact between the two substrates and therefore provide conductive paths in the z-axis direction. Generally, these types of adhesive films are designed to be compressed to a thickness close to the diameter of a conductive particle, i.e., conductive paths span only a single particle. Therefore, the particle size distribution and loading determine a minimum lateral spacing required between conductive features, corresponding to the spacing between pixels in an active-matrix display. The smallest particulate adhesive available from 3M contains 6 μm particles and the technical literature advises a minimum gap of 35 μm between laterally adjacent conductive features to ensure that lateral shorting does not occur. It may be difficult to apply the z-axis compression necessary to introduce anisotropy into such adhesives without risk of damage to some types of electro-optic materials, for example encapsulated electrophoretic materials. More importantly, high resolution active matrix displays with a resolution of about 160 lines per inch have gaps between neighboring pixels of only about 6 μm. Thus, the commercially available products appear to be inadequate for use in such displays and simply scaling down the particle size in these materials will not yield a suitable anisotropic adhesive.

To avoid these problems with the commercial materials, the present invention provides a process for forming a layer of an anisotropic adhesive having greater conductivity perpendicular to the plane of the layer than in this plane. The process comprises dispersing a plurality of conductive particles in an adhesive matrix, the particles having a complex conductivity differing from that of the matrix; applying to the particles/matrix mixture an electric or magnetic field effective to cause the particles to form conductive strands extending substantially perpendicular to the plane of the layer; and increasing the viscosity of the matrix (typically by gelling or curing the matrix) to prevent the particles moving our of the strands.

Figure 3B:
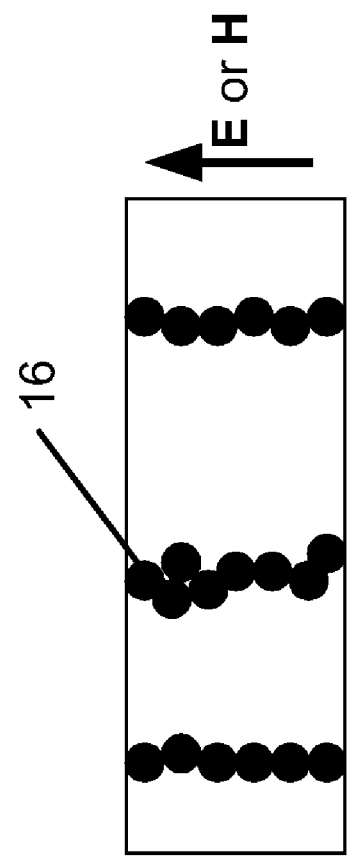
FIGS. 3A and 3B are schematic cross-sections through an adhesive layer at two successive stages of the process of the present invention.
Figure 3A:
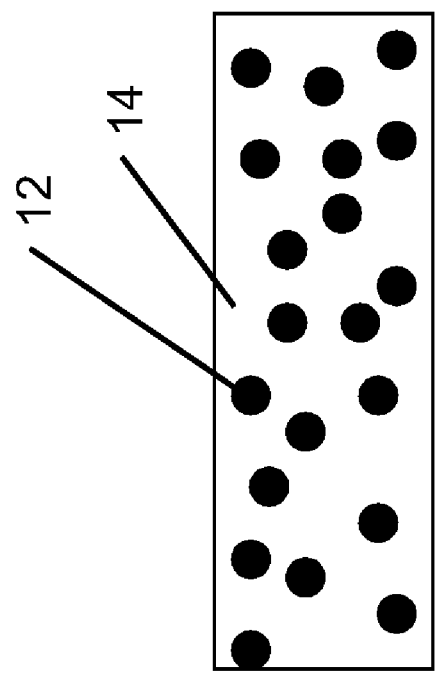

The use of electrorheological and magnetorheological effects to produce anisotropically conductive films by the process of the present invention is illustrated in a highly schematic manner in FIGS. 3A and 3B of the accompanying drawings. The electrorheological (ER) effect is an effect by which application of an electrical field across a particulate dispersion, e.g., a dispersion contained between parallel plate electrodes, causes the particles composing the dispersion to form into strands or acicular agglomerates. As shown in FIG. 3A, the process begins by forming a layer of conductive particles 12 dispersed in a matrix (continuous phase) of a lamination adhesive 14. An electric or magnetic field is applied perpendicular to the plane of the layer, thereby causing the particles 12 to form strands 16 extending through the thickness of the layer, as illustrated in FIG. 3B. Finally, the viscosity of the matrix 14 is greatly increased, typically by gelling or curing the matrix, to prevent further movement of the particles 12 through the matrix 14, and thus lock the strands 16 in place.

Formation of strands parallel to the electric field lines occurs when the complex conductivity (k*) of the particles is significantly higher than that of the matrix. In a preferred process of the present invention, the precursor adhesive (as shown in FIG. 3A) consists of relatively high conductivity particles, $k_p > 10^{-9}$ S/cm, dispersed in a low conductivity matrix, $k_f < 10^{-11}$ S/cm. The particles are aligned in the z-axis direction by application of an electric field across the dispersion, and the resultant z-axis strands are locked in place by curing or gelling the matrix. The final adhesive film then contains conductive strands spanning or percolating only in the z-axis direction because strands are spaced laterally and therefore separated by the low conductivity matrix. Z-axis conduction will be dominated by the conductivity of the strands and therefore by the particle conductivity, while lateral conductivity will be dominated by that of the continuous low conductivity matrix.

This method is particularly well-suited for preparing continuous thin films of a z-axis lamination adhesive. For example, continuous thin film z-axis conductive adhesives can be prepared by feeding a well mixed dispersion of conductive particles in a low conductivity adhesive matrix into a coating die, and coating the dispersion into a thin film, typically 10–100 μm thick, followed by application of the electric field and curing or gelling.

A magnetorheological process for producing a z-axis conductive adhesive is similar to the electrorheological process; magnetic particles are dispersed in a non-magnetic adhesive matrix, the particles are aligned into strands in the z-axis direction by application of a magnetic field, and the strands are locked in by curing or gelling of the matrix. In this case, the particles need to be both magnetically polarizable and to have a conductivity in the range described above, typically greater than $10^{-9}$ S/cm. The range of particles meeting these requirements for the magnetorheological process is perhaps more limited than the range of particles suitable for the electrorheological process, but a magnetorheological process is of interest because application of the magnetic field across the layer does not require making electrical contact with the surface of the layer, and thus an aqueous based adhesive matrix can be used, which is typically not the case with the electrorheological process.

In lamination adhesive compositions for use in the electrorheological process of the present invention, the conductive particles desirably have a conductivity greater than $10^{-9}$ S/cm, and a diameter not greater than about 1/10 of the thickness of the final film. (The term "diameter" is used herein to include what is usually known as the "equivalent diameter" of a non-spherical particle, namely the diameter of a spherical particle having the same volume as the non-spherical one.) The particles can be formed from semiconducting polymers, for example acidically doped polyanilines, polythiophenes, and pyrolyzed polyacrylonitriles. The particles may alternatively be formed from low k* materials that are "activated" (raised) to higher k* (relative to that of the matrix) by addition of trace amount of a polar material, for example water or ethylene glycol, that adsorbs primarily on the surface of the particles. Suitable low k* materials include cellulosic materials, and various aluminas, silicates, and zeolites. The matrix (continuous phase) should have a low conductivity relative to that of the particles, this low conductivity preferably being less than $10^{-10}$ S/cm. Many low-conductivity, low-viscosity oils, such as the hydrocarbons used as the suspending fluids in many encapsulated electrophoretic media may be suitable; however the matrix must also behave as an adhesive, and be gellable or curable act to lock in the z-axis strands formed in the process. For example thermally reversible gelling materials such as Kraton (Registered Trade Mark) rubbers (block copolymers) may be particularly advantageous as a continuous phase, alone or in combination with a diluent to lower viscosity for coating and particle alignment. Typical non-aqueous pressure sensitive adhesives like polyacrylate solutions, or succinate-functionalized hydrocarbon polymers, for example ethylene propylene copolymers, or silicone rubber type adhesives, may also be used. For gelling type matrices, coating and particle alignment occurs under conditions where the material is not gelled, and then after formation of the strands, the matrix is gelled, for example by lowering the temperature or cross-linking the matrix by addition or removal of a chemical component or reactant or exposure to an ultra-violet light source. For solvent based non-aqueous adhesives, the strands can be locked in position by rapidly evaporating the solvent.

The magnetorheological process of the present invention may use any of the types of matrices discussed above, since the magnetorheological process differs from the electrorheological process only in the formation of the strands by magnetic field alignment instead of electric field alignment. However, since the magnetorheological process can make use of aqueous matrices as well as non-aqueous ones, polyurethane adhesives, gelatin, or other aqueous continuous phases may also be used. Particles suitable for use in the magnetorheological process include iron and other magnetizable materials, such as nickel and carbonyl iron; these materials are generally supplied in particle sizes greater than 1–10 μm, which may not be optimal for preparing thin films of adhesive, but they may be milled to smaller sizes for use in the present process. Iron oxides, such as $\gamma$-$Fe_2O_3$ materials used in the magnetic recording industry, are typically supplied in much smaller particle sizes, around 10–100 nm, and may therefore be used as supplied in the preparation of thin films.

The criteria for particles to be used in the magnetorheological process of the present invention differ somewhat from most other applications of magnetorheological particles. The present process does not require strong saturation magnetization, a typical criterion for choosing particles for a magnetorheological fluid, but in the present process the particles should be conductive enough to satisfy the z-axis conductivity range outlined above.

The processes of the present invention provide an anisotropically conductive lamination adhesive film having high z-axis conductivity gelled or locked into the film. This film can then be laminated to the electro-optic material and ultimately to an active matrix backplane, under conditions where the anisotropic conductivity of the adhesive is maintained because the film never undergoes large scale flow (with respect to strand length) during the lamination processes.

Some processes of the present invention allow production of an anisotropically conductive lamination adhesive the z-axis conductivity of which can be orders of magnitude greater than the lateral conductivity. This type of adhesive maximizes the electric field gradient across the electro-optic material (and therefore maximizes the switching speed and/or electro-optical properties for a given impulse of the electro-optic material) while eliminating or minimizing lateral charge leakage between neighboring pixels, thus allowing improved electro-optic display performance from any given electro-optic material. In addition, since the z-axis conductivity is much greater than the lateral conductivity, display which exhibit temperature and humidity sensitivity should exhibit less sensitivity than corresponding displays employing isotropic lamination adhesives, thus enabling such displays to operate under a wider range of environmental conditions.

Any anisotropic z-axis conductive adhesive based upon conductive strands or similar conductive regions within an essentially non-conductive matrix needs to have sufficient strands or conductive regions per unit area for each pixel of the electro-optic material with which the adhesive is used to experience a substantial uniform or homogeneous electric field over its entire area, or undesirable optical effects may occur. The processes of the present invention provide great flexibility in adjusting strand density per unit area, for example by altering conductive particle size, volume fraction of conductive particles, and the intensity and duration of the aligning field, thereby allowing the fine structure of the anisotropic adhesive to be varied.

Typically, the processes of the present invention will be carried out using sub-micron conductive particles. Sub-micron particles have hitherto not been regarded as an advantageous size range for electrorheological and magnetorheological fluids because as particle size decreases Brownian motion increases and this motion tends to disrupt or weaken structures formed from the conductive particles. However, two aspects of the processes of the present invention reduce such problems. Firstly, continuous phases can be used having relatively high viscosity compared to those typically used for electrorheological and magnetorheological applications and the high viscosity acts to decrease Brownian motion. Secondly, the present processes need only provide an anisotropic strand structure, not such a structure having high shear strength, since once the strand structure is formed, it can be locked in by gelling or curing the polymer matrix, and after such gelling or curing the shear strength of the strand structure is no longer an issue.

Consideration will now be given to matters specific to the manufacture of electro-optic displays using encapsulated electrophoretic materials. It should be noted that the considerations discussed below apply to the manufacture of all encapsulated electrophoretic displays, not only those using anisotropic adhesives. There are a number of important areas which need to be considered, including dewatering of the capsules, the binder/solids ratio in the final electrophoretic medium, lamination processes and materials, planarization and capsule size uniformity. Each of these areas is discussed in more detail below.

As already indicated, typically encapsulated electrophoretic media consist of a dispersion of capsules in a polymeric binder. The capsules contain an electrophoretically active suspension. The dispersion is typically coated onto a front electrode on a flexible polymeric substrate, preferably achieving a substantially close-packed monolayer of microcapsules (see the aforementioned 2003/0137717). This coated film is then laminated to a rear substrate previously patterned in a single or multi-layer electrode structure. The following discussion relates to materials and processes for the lamination step in such a process in the construction of an encapsulated electrophoretic display, although certain of these materials and processes may be used in the manufacture of any electro-optic display where the joining of a front active surface to a rear electrode substrate is desired.

The encapsulation process produces a capsule slurry, which is typically dewatered to achieve a target solids content; such dewatering can be achieved through centrifugation, absorption, evaporation, mesh filtration, or osmotic separation. After dewatering, the slurry is typically mixed with a polymeric binder (normally in the forma of a polymer latex), for example an aqueous polyurethane dispersion. This slurry of capsules in binder is then agitated to ensure uniform distribution of the binder material. It has been found that in order to encourage close packing of the capsules in the monolayer film, the binder solids to capsule solids ratio should be kept as low as possible. Minimizing the amount of non-optically active material (such as binder) allows the highest possible contrast ratio between the white and dark state of the final display. However, the binder is present in the electrophoretic medium to provide structural integrity, and the optimum amount of binder is therefore a compromise between reducing the amount of binder to improve optical properties and increasing the amount of binder for structural integrity. It has been found that the optimal binder solids to capsule mass ratio is typically in the range of 1:2 and 1:20, preferably between 1:4 and 1:12, and most desirably between 1:6 and 1:10. These ratios also apply to the polymer matrix content in a polymer-dispersed electrophoretic display of the type previously described.

The slurry of microcapsules in aqueous binder is then coated down into a film, preferably one containing a monolayer of capsules, by any convenient process, such as by metering through a slot die coating head. To produce the structure shown in FIG. 1, the slurry is generally coated onto an ITO layer previously formed on a polyester substrate, which will ultimately serve as the front transparent electrode and substrate. The resultant capsule film is dried through evaporation of the aqueous phase, typically at 60° C.

To produce the final display, the dried capsule film is laminated to a rear electrode structure, which may be of the type described in, for example, the aforementioned U.S. Pat. Nos. 6,232,950 and 6,445,374, and consist of a multi-layer conductor/insulator stack printed on the substrate. The conductors used are typically conductive particle (i.e. carbon, silver, palladium, tin oxide, doped tin oxide, copper) doped polyesters and vinyl polymers which are screen printed and heat cured. Alternatively, the rear electrode structure may be an active matrix backplane, as described for example in the aforementioned WO 00/67327 and 2002/0019081.

There are several possible processes to join the dried film with the rear electrode structure. In one such process, the dried film is used as prepared and laminated directly to the rear substrate, which has electrodes on the topmost layer. This lamination is performed with heat and pressure, typically supplied by a vacuum chamber.

However, films prepared by this process are susceptible to several flaws. As discussed above, the binder level in the dried film is kept as low as possible to maximize optically active area, which means that there is very little binder to flow and absorb the stresses of the lamination pressure. The capsule wall bears the brunt of these stresses, which can result in capsule breakage. Additionally, with little plastic material to flow into the voids between capsules, the resulting film may have trapped air or trapped vacuum pockets, either of which can both change the mechanical stresses experienced by the film and affect the electrical characteristics, which may result in non-uniform switching of the final display.

In an alternative process, an additional insulator layer is provided as the topmost layer of the rear electrode structure, i.e., the layer which directly contacts the dried film during the lamination process. This insulator layer is preferably an adhesive which can flow at the lamination temperature. For example, it could be a polymeric material identical or similar to that of the binder material, or it could be a hot melt adhesive sheet, which could be thermoplastic or thermosetting. Alternatively, it could be a material which is initially in liquid form at room temperature but forms a solid matrix after curing or cross-linking. Such insulator layers provide a flowable material which can fill in any voids between capsules and smooth out the roughness of the exposed surface of the dried film during the lamination process without putting undue stresses on the capsule walls themselves.

In another alternative process, an additional adhesive layer is initially coated on to the dried film (i.e. on to the exposed surface of the capsules) before the lamination procedure. This additional adhesive layer serves to planarize the capsule film and provide a tacky surface to facilitate the lamination. This process has advantages in that the dried film will then be planarized before the lamination, and there is no need to store tacky front and rear substrates separately, since only the front substrate (i.e., the dried film) will be tacky. The thickness of the planarization layer (or the adhesive layer on the rear substrate) can be reduced by using more uniform capsules. It has been found that capsules which are mostly monodispersed are most efficient in that they require the smallest thickness of planarization layer.

Turning to consideration of the lamination process itself, it will be seen that in the fabrication of electrophoretic devices an effective lamination process is essential. Several types of lamination process may be are used for this purpose, including batch unit operations.

As already indicated, the lamination process typically involves bringing the two electrodes and the dried capsule-containing layer together, followed by a heated pressing process. The pressing process may be either in a vacuum bagging operation or in a bladder press, the objective in either case being the close contact of thermoplastic layers of resin, with the exclusion and expulsion of entrapped air bubbles. For effective void-free lamination, all air spaces must be filled by resin during this heated pressing process. The flow properties of the resins, even at the moderately elevated temperatures reached during lamination and cure, may not be adequate for void filling.

This problem may be mitigated by the use of thickened liquid resins capable of cure by externally applied radiation, for example, by the use of an ultra-violet curing system. With carefully controlled irradiation and cure kinetics, rear electrode assemblies opaque to radiation may be effectively laminated to front electrodes bearing a dried capsule-containing layer.

Figure 4:
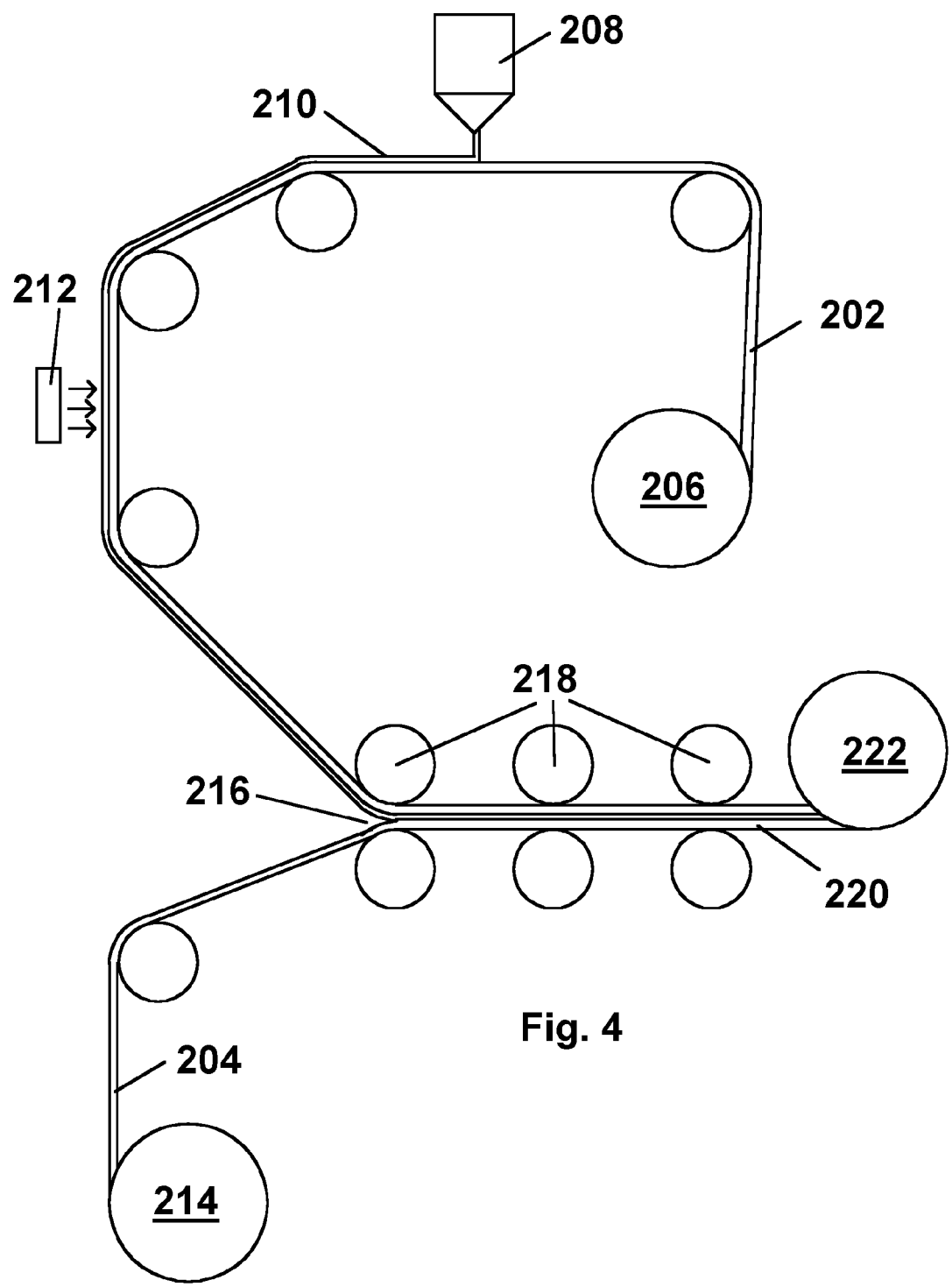
FIG. 4 is a schematic side elevation of apparatus which may be used to carry out a process of the present invention.

A preferred process of this type is illustrated in a highly schematic manner and in side elevation in FIG. 4 of the accompanying drawings. As shown in this Figure, the process forms a display by the convergence of two webs 202 and 204. The web 202, comprises a rear electrode assembly on a flexible substrate, although the individual components are not shown in FIG. 4. Similarly, the web 204 comprises a flexible substrate, a transparent electrode layer, for example an ITO layer, and a dried film of capsules and binder, although again the individual components are not shown in FIG. 4. As shown in FIG. 4, the web 202 is unwound from a feed spool 206 and brought, electrode side up, beneath a die 208 for coating with a thin layer of a radiation curable lamination adhesive 210. The adhesive 210 may for example be curable by visible, ultra-violet or electron beam radiation. The web 202 bearing adhesive 210 passes a radiation source 212, the intensity of which is adjusted having regard to both the catalyst concentration (and hence curing speed) of the adhesive 210 and the speed of the web 202. (If an anisotropic adhesive is being used, an electrical or magnetic head may be provided between the die 208 and the radiation source 212 to form the desired strands of conductive particles before the matrix is cured or gelled by the radiation source 212.)

The web 204 is unwound from a feed spool 214 and carries the dried capsule-containing layer to a convergence point 216, at which the webs 202 and 204 are brought together. At this convergence point 216, the radiation curable resin 210 is still in liquid form, and easily fills voids on the surface of the capsule-containing layer. The coordination of web speed, catalyst concentration and radiation intensity is adjusted to provide a cure rate such that hardening occurs after the convergence point 216, while the two webs 202 and 204 are being held together with rollers 218. Finally, the laminated web 220 produced is wound on a take-up spool 222a.

It will be seen that the foregoing process allows the lamination process to operate in-line, and thus enables higher production rates than the batch unit processes previously discussed.

When using a radiation-curable adhesive, it is greatly preferred that this be an adhesive which can undergo curing in the presence of water. The use of such waterborne, or water-reducible, radiation-curable adhesives is highly desirable when, as is typically the case, an encapsulated electrophoretic medium has capsules the walls of which are formed from hydrophilic materials; for convenience, such capsules may hereinafter be called "hydrophilic capsules". (In practice, most electrophoretic media use hydrocarbon-based hydrophobic suspending fluids, and it is easier to encapsulate such hydrocarbon-based suspending fluids in hydrophilic materials, since the hydrophilic materials used for the capsule walls are essentially insoluble in the suspending fluid, thus avoiding problems which might arise from the presence of "impurities" in the suspending fluid.) It has been found empirically that it is difficult if not impossible to disperse hydrophilic capsules in most polymeric and oligomeric matrices, which are typically hydrophobic. Water-reducible resins, which allow small quantities of water to be added primarily for viscosity reduction, are available commercially, and it has been found that these water-reducible resins will accept and disperse hydrophilic capsules with little difficulty.

When a water-reducible resin is the used, the radiation-curable adhesive typically consists essentially of three components, namely a high solids water-reducible oligomer, a water-compatible monomer and a catalyst. Significant formulation latitude can be achieved by the use of more than one of any of the components in a single formulation.

Oligomers include both aliphatic and aromatic urethane acrylates, urethane methacrylates, epoxy acrylates, epoxy methacrylates, specialty low viscosity aliphatic and aromatic mono- and di-acrylates, and polyester acrylates. These materials are generally supplied as very high viscosity liquids.

Water-compatible monomers include mono-, di- and tri-functional materials, which can be water-soluble, water-reducible, or only soluble in the oligomer. Monomers of interest include isobornyl acrylate, cyclohexyl acrylate, several epoxy acrylates, low ethoxylated trimethylolpropane triacrylate, tetraethylene glycol diacrylate, phenoxyethyl acrylate, polyethylene glycol ethyl ether acrylate, diethylene glycol 2ether acrylate, pentaerythritol tetraacrylate, pentaerythritol diacrylate monostearate, castor oil, methyl methacrylate, butyl methacrylate, N-(hydroxymethyl) acrylamide, polyethylene glycol 400 diacrylate, 1,5-hexanediol diacrylate, bisphenol-A epoxy diacrylate, water soluble triacrylates, and others.

Catalysts vary significantly with the type of radiation used for curing, and with the intended type of cross-linking. In thin films, such as are typically used in electro-optic displays, the α-cleavage photoinitiators Darocure (Registered Trade Mark) 1173 and members of the Irgacure (Registered Trade Mark) series (369, 907, 651 and 184) may be used. Benzophenone may be used to speed up curing by reducing air inhibition at the surface of the resin. Photoinitiators are not needed in electron beam curable systems. At low concentrations, camphorquinone and a tertiary amine can be used for visible light curing.

In general, the use of water-reducible oligomers does not yield a hard cured resin. However, the ratio of the various levels of functionality of both the monomer and oligomer plays a significant role in the final hardness of the cured system. Lack of hardness is not a major issue in flexible displays, and in this regard, as previously, mentioned, significant latitude is possible with multiple component blending.

Good results have been achieved in encapsulated electrophoretic displays using several mixtures of oligomer 155 (a water-reducible material from PurElaSt (Polymer Systems Corp)), epoxy acrylate, n-vinylpyrrolidone, ethoxylated trimethylpropane triacrylate, Darocure 1173 and water. The best results were obtained when the formulation was made up without the catalyst and stored in light-shielded containers, with the catalyst being added immediately prior to use.

Several advantages are inherent in the use of radiation cured systems, particularly water-reducible systems. Reduced handling of devices before and after lamination can be realized from the ability of the water-reducible systems to cure without having the water removed, but some water removal prior to curing has been found to gives increased lamination strength. Curing can be achieved through transparent polyethylene terephthalate, or, as in the system of FIG. 4, curing may be allowed to proceed after irradiation; either case allows for a very uniform lamination with a central adhesive layer that transforms from liquid to solid. The need for large thermal ovens is reduced when using ultra-violet curing systems, with resultant significant plant operating cost reductions. Since curing can occur with water in solution with the resins, a very clear and durable film results, from which the water will eventually evaporate. This can be used to great advantage if a vapor-permeable electrode is used in the display.

It has been found that ultra-violet-cured systems adhere very well to cured waterborne systems, opening the possibility of using a specific ultra-violet layer to passivate or shield an electrode. Since ultra-violet curing is rapid and simple, multiple laminations with ultra-violet cured resins are possible, if needed. Switching characteristics of electrophoretic displays have been found to be unaffected by the ultra-violet exposure needed for lamination.

The following Example is now given, though by way of illustration only, to show details of preferred materials, processes and techniques used in the present invention.

EXAMPLE

This Example describes the preparation of a display of the present invention using a gelatin/acacia microencapsulated electrophoretic medium.

A Preparation of Oil (Internal) Phase

To a 1L flask is added 0.5 g of Oil Blue N (Aldrich, Milwaukee, Wis.), 0.5 g of Sudan Red 7B (Aldrich), 417.25 g of Halogenated hydrocarbon Oil 0.8 (Halogenated Hydrocarbon Products Corp., River Edge, N.J.), and 73.67 g of Isopar-G (Exxon, Houston, Tex. —"ISOPAR" is a Registered Trade Mark). The mixture is stirred at 60° C. for six hours and is then cooled to room temperature. 50.13 g of the resulting solution is placed in a 50 mL polypropylene centrifuge tube, to which is added 1.8 g of titanium dioxide ($TiO_2$) (E.I. du Pont de Nemours & Company, Wilmington, Del.), 0.78 g of a 10% solution of OLOA 1200 (Chevron, Somerset, N.J.), in Halogenated hydrocarbon Oil 0.8, and 0.15 g of Span 85 (Aldrich). This mixture is then sonicated for five minutes at power 9 in an Aquasonic Model 75D sonicator (VWR, Westchester, Pa.) at 30° C.

B Preparation of Aqueous Phase 10.0 g of acacia (Aldrich) is dissolved in 100.0 g of water with stirring at room temperature for 30 minutes. The resulting mixture is decanted into two 50 mL polypropylene centrifuge tubes and centrifuged at about 2000 rpm for 10 minutes to remove insoluble material. 66 g of the purified solution is then decanted into a 500 mL non-baffled jacketed reactor, and the solution is then heated to 40° C. A six-blade (vertical geometry) paddle agitator is then placed just beneath the surface of the liquid. While agitating the solution at 200 rpm, 6 g of gelatin (300 bloom, type A, Aldrich) is carefully added over about 20 seconds in order to avoid lumps. Agitation is then reduced to 50 rpm to reduce foaming. The resulting solution is then stirred for 30 minutes.

C Encapsulation

With agitation at 200 rpm, the oil phase, prepared as described above, is slowly poured over about 15 seconds into the aqueous phase, also prepared as described above. The resulting oil/water emulsion is allowed to emulsify for 20 minutes. To this emulsion is slowly added over about 20 seconds 200 g of water that has been pre-heated to 40° C. The pH is then reduced to 4.4 over five minutes with a 10% acetic acid solution (acetic acid from Aldrich). The pH is monitored using a pH meter that was previously calibrated with pH 7.0 and pH 4.0 buffer solutions. The resultant mixture is stirred for 40 minutes. 150 g of water that has been preheated to 40° C. is then added, and the contents of the reactor are then cooled to 10° C. When the solution temperature reaches 10° C., 3.0 mL of a 37% formalin solution (Aldrich) is added, and the solution is further stirred for another 60 minutes. 20 g of sodium carboxymethylcellulose is added, and the pH is then raised to 10.0 by the addition of a 20 wt % solution of sodium hydroxide. The thermostat bath is then set to 40° C. and allowed to stir for another 70 minutes. The slurry is allowed to cool to room temperature overnight with stirring. The resulting capsule slurry is then ready to be sieved.

D Formation of Display

The resulting capsule slurry from Part C above is mixed with an aqueous urethane binder NeoRez R-9320 (Zeneca Resins, Wilmington, Mass.) at a weight ratio of one part binder to 10 parts capsules. The resulting mixture is then coated using a doctor blade onto a 0.7 mm thick sheet of indium-tin oxide sputtered polyester film. The blade gap of the doctor blade is controlled at 0.18 mm so as to lay down a single layer of capsules. The coated film is then dried in hot air (60° C.) for 30 minutes. After drying, the dried film is hot laminated at 60° C. to a backplane comprising a 3 mm thick sheet of polyester screen printed with thick film silver and dielectric inks with a pressure of 15 psi in a hot roll laminate from Cheminstruments, Fairfield, Ohio. The backplane is connected to the film using an anisotropic tape. The conductive areas form addressable areas of the resulting display.

As already indicated, it will be apparent to those skilled in electro-optic display technology that, in addition to anisotropic conductivity, the adhesive used in the displays of the present invention should satisfy numerous other requirements. For a full discussion of these other requirements, the reader is referred to the aforementioned copending application Ser. No. 10/064,389.

It will be apparent to those skilled in the art that numerous changes and modifications can be made in the specific embodiments of the present invention described above without departing from the scope of the invention. In particular, although the invention has been described above mainly in connection with encapsulated electrophoretic media having discrete capsules, similar advantages can be achieved by the use of anisotropic adhesives in the other types of electro-optic displays previously discussed. Accordingly, the whole of the foregoing description is to be construed in an illustrative and not in a limitative sense.

The invention claimed is:

1. An electro-optic display comprising a layer of a solid electro-optic material, at least one electrode disposed adjacent the layer of electro-optic material, and a layer of a lamination adhesive interposed between the electro-optic material and the electrode, the lamination adhesive having a higher electrical conductivity in a direction perpendicular to the layer of lamination adhesive than in the plane of the layer.

2. An electro-optic display comprising a layer of a solid electro-optic material, at least one electrode disposed adjacent the layer of electro-optic material, and a layer of a lamination adhesive interposed between the electro-optic material and the electrode, the lamination adhesive having a higher electrical conductivity in a direction perpendicular to the layer of lamination adhesive than in the plane of the layer, the lamination adhesive having a conductivity of less than about $10^{-10}$ S/cm. in the plane of the adhesive layer and a conductivity greater than about $10^{-9}$ S/cm. perpendicular to this plane.

3. An electro-optic display according to claim 1 wherein the lamination adhesive comprises a plurality of conductive particles dispersed in a substantially non-conductive matrix.

4. An electro-optic display comprising a layer of a solid electro-optic material, at least one electrode disposed adjacent the layer of electro-optic material, and a layer of a lamination adhesive interposed between the electro-optic material and the electrode, the lamination adhesive having a higher electrical conductivity in a direction perpendicular to the layer of lamination adhesive than in the plane of the layer, the lamination adhesive comprising a plurality of conductive particles dispersed in a substantially non-conductive matrix, the conductive particles having a conductivity greater than about $10^{-9}$ S/cm. and a diameter not greater than about one-tenth of the thickness of the layer of lamination adhesive.

5. An electro-optic display according to claim 3 wherein the conductive particles are formed from a semiconducting polymer.

6. An electro-optic display according to claim 3 wherein the conductive particles are formed from a low conductivity material having a polar material adsorbed on its surface to increase its conductivity.

7. An electro-optic display comprising a layer of a solid electro-optic material, at least one electrode disposed adjacent the layer of electro-optic material, and a layer of a lamination adhesive interposed between the electro-optic material and the electrode, the lamination adhesive having a higher electrical conductivity in a direction perpendicular to the layer of lamination adhesive than in the plane of the layer, the lamination adhesive comprising a plurality of conductive particles dispersed in a substantially non-conductive matrix, the matrix having a conductivity less than about $10^{-10}$ S/cm.

8. An electro-optic display according to claim 3 wherein the matrix comprises a gellable material.

9. An electro-optic display according to claim 8 wherein the matrix comprises any one or more of a thermally reversibly gellable polymer, a radiation-gellable material or a material which can be gelled by removal of a solvent therefrom.

10. An electro-optic display according to claim 1 wherein the lamination adhesive comprises a plurality of magnetizable particles dispersed in a substantially non-magnetizable matrix.

11. An electro-optic display according to claim 10 wherein the magnetizable particles comprise an iron oxide.

12. An electro-optic display according to claim 1 wherein the electro-optic material is a rotating bichromal member, microcell, electrochromic or electrophoretic material.

13. An electro-optic display according to claim 12 wherein the electro-optic material is an encapsulated electrophoretic material.

14. An article of manufacture comprising, in order:
a light-transmissive electrically-conductive layer;
a layer of a solid electro-optic medium in electrical contact with the electrically-conductive layer;
a layer of an adhesive having a higher electrical conductivity in a direction perpendicular to the layer of lamination adhesive than in the plane of the layer; and
a release sheet.

15. An article of manufacture comprising:
a layer of a solid electro-optic medium having first and second surface on opposed sides thereof;
a first adhesive layer on the first surface of the layer of solid electro-optic medium;
a release sheet disposed on the opposed side of the first adhesive layer from the layer of solid electro-optic medium; and
a second adhesive layer on the second surface of the layer of solid electro-optic medium,
at least one of the first and second adhesive layers having a higher electrical conductivity in a direction perpendicular to the adhesive layer than in the plane of the layer.

16. An article of manufacture according to claim 14 wherein the solid electro-optic medium is a rotating bichromal member, microcell, electrochromic or electrophoretic medium.

17. An article of manufacture according to claim 16 wherein the solid electro-optic medium is an encapsulated electrophoretic medium.

18. An article of manufacture according to claim 14 wherein the solid electro-optic medium has internal liquid- or gas-filled spaces.

19. An article of manufacture according to claim 15 wherein the solid electro-optic medium is a rotating bichromal member, microcell, electrochromic or electrophoretic medium.

20. An article of manufacture according to claim 19 wherein the solid electro-optic medium is an encapsulated electrophoretic medium.

21. An article of manufacture according to claim 15 wherein the solid electro-optic medium has internal liquid- or gas-filled spaces.

22. An electro-optic display according to claim 1 wherein the layer of a solid electro-optic material has internal liquid- or gas-filled spaces.

* * * * *

UNITED STATES PATENT AND TRADEMARK OFFICE
CERTIFICATE OF CORRECTION

PATENT NO. : 7,110,163 B2  
APPLICATION NO. : 10/708121  
DATED : September 19, 2006  
INVENTOR(S) : Webber et al.

Page 1 of 1

It is certified that error appears in the above-identified patent and that said Letters Patent is hereby corrected as shown below:

On Title page Item (75):

Replace the entire Section beginning "(75) Inventors:" with the following:

Item --(75) Inventors: Richard M. Webber, Brookline, MA (US); Joseph M. Jacobson, Newton Centre, MA (US); Jonathan D. Albert, Philadelphia, PA (US); Andrew L. Loxley, Roslindale, MA (US)--

Signed and Sealed this

Twenty-seventh Day of May, 2008

JON W. DUDAS  
*Director of the United States Patent and Trademark Office*